United States Patent
Li et al.

(10) Patent No.: US 11,245,479 B2
(45) Date of Patent: Feb. 8, 2022

(54) ANTENNA PERFORMANCE EVALUATION DETERMINING OBSTACLE INFORMATION BASED ON PERFORMANCE AND REFERENCE PERFORMANCE MAPS

(71) Applicant: Telefonaktiebolaget LM Ericsson (publ), Stockholm (SE)

(72) Inventors: Ming Li, Beijing (CN); Qingyu Miao, Beijing (CN); Jianfeng Wang, Beijing (CN); Zengjie Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 163 days.

(21) Appl. No.: 16/349,316

(22) PCT Filed: Dec. 13, 2016

(86) PCT No.: PCT/CN2016/109650
§ 371 (c)(1),
(2) Date: May 13, 2019

(87) PCT Pub. No.: WO2018/107357
PCT Pub. Date: Jun. 21, 2018

(65) Prior Publication Data
US 2020/0119819 A1     Apr. 16, 2020

(51) Int. Cl.
*H04B 17/24*     (2015.01)
*H04W 24/08*     (2009.01)
(Continued)

(52) U.S. Cl.
CPC ............ *H04B 17/24* (2015.01); *H04B 17/15* (2015.01); *H04B 17/318* (2015.01); *H04W 24/08* (2013.01); *H04W 24/10* (2013.01)

(58) Field of Classification Search
CPC .... H04B 7/0617; H04B 7/024; H04B 7/0452; H04B 17/309; H04B 7/0413;
(Continued)

(56) References Cited

U.S. PATENT DOCUMENTS

| | | |
|---|---|---|
| 2011/0130135 A1 | 6/2011 | Trigui |
| 2013/0142054 A1 | 6/2013 | Ahmadi |

(Continued)

FOREIGN PATENT DOCUMENTS

| | | |
|---|---|---|
| CN | 103138855 A | 6/2013 |
| CN | 103826249 A | 5/2014 |
| EP | 2148447 A1 | 1/2010 |

OTHER PUBLICATIONS

International Search Report and Written Opinion for International Patent Application No. PCT/CN2016/109650, dated Jul. 27, 2017, 11 pages.

(Continued)

*Primary Examiner* — Philip Sobutka
(74) *Attorney, Agent, or Firm* — Sage Patent Group (57) ABSTRACT

Method, apparatus, computer program and computer readable storage medium are disclosed for antenna performance evaluation. According to an embodiment, signal metrics and positions of a plurality of user equipments within a coverage area of an antenna array are acquired. An antenna performance map showing how signal metric as a variable changes relative to position as another variable is generated from the signal metrics and positions. Obstacle related information is determined based on the generated antenna performance map and a reference antenna performance map. A base station comprising the apparatus is also disclosed.

19 Claims, 5 Drawing Sheets

(51) Int. Cl.
 *H04W 16/28* (2009.01)
 *H04B 17/15* (2015.01)
 *H04B 17/318* (2015.01)
 *H04W 24/10* (2009.01)

(58) Field of Classification Search
 CPC .... H04B 7/0626; H04B 7/063; H04B 17/318; H04B 17/336; H04B 7/0632; H04W 16/28; H04W 24/02; H04W 16/18; H04W 4/025; H04W 16/10; H04W 16/22
 USPC ...................... 455/456.1, 456, 446
 See application file for complete search history.

(56) References Cited

U.S. PATENT DOCUMENTS

| 2014/0044042 | A1* | 2/2014 | Moshfeghi ........... H04B 17/336 370/328 |
| 2015/0230263 | A1 | 8/2015 | Roy et al. |
| 2016/0165462 | A1 | 6/2016 | Tan et al. |
| 2016/0330643 | A1 | 11/2016 | Sahin et al. |

OTHER PUBLICATIONS

Extended European Search Report issued in corresponding EP Application No. 16923731.0 dated Sep. 25, 2020, 08 Pages.

* cited by examiner

FIG. 10

ANTENNA PERFORMANCE EVALUATION DETERMINING OBSTACLE INFORMATION BASED ON PERFORMANCE AND REFERENCE PERFORMANCE MAPS

This application is a 35 U.S.C. § 371 national phase filing of International Application No. PCT/CN2016/109650, filed Dec. 13, 2016, the disclosure of which is incorporated herein by reference in its entirety.

TECHNICAL FIELD

Embodiments of the disclosure generally relate to wireless communication, and, more particularly, to method, apparatus, computer program and computer readable storage medium for antenna performance evaluation as well as base station comprising the apparatus.

BACKGROUND

Figure 1:
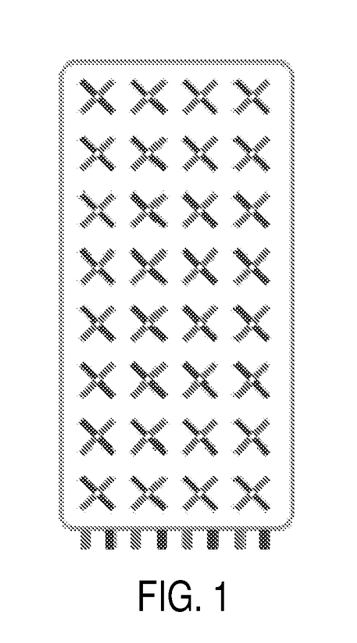
FIG. 1 is a schematic diagram showing an antenna array.

Antenna array has been widely used in base stations. It generally comprises a set of individual antenna units such as orthogonal dipole antenna units shown in FIG. 1. In combination with multiple-input multiple-output (MIMO) technologies, the capacity of wireless channel may be increased without increasing the bandwidth and transmission power. Recently, massive MIMO (also known as large-scale antenna systems, very large MIMO, or hyper MIMO) has been developed. It makes use of a very large amount (e.g., hundreds or thousands) of service antennas that are operated fully coherently and adaptively. Thereby, the transmission and reception of signal energy may be focused into ever-smaller regions of space. This may bring huge improvements in throughput and energy efficiency, in particular when combined with simultaneous scheduling of a large number (e.g., tens or hundreds) of user terminals.

Therefore, it is very important to keep an antenna array in a good performance state. To this end, it may be necessary to evaluate the performance of the antenna array from time to time. In view of this, it would be desirable to provide an effective and convenient way to evaluate the performance of an antenna array.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

One of the objects of the disclosure is to provide an effective and convenient way to evaluate the performance of an antenna array.

According to one aspect of the disclosure, it is provided a method for antenna performance evaluation. The method comprises acquiring signal metrics and positions of a plurality of user equipments (UEs) within a coverage area of an antenna array. The method further comprises generating, from the signal metrics and positions, an antenna performance map showing how signal metric as a variable changes relative to position as another variable. The method further comprises determining obstacle related information based on the generated antenna performance map and a reference antenna performance map.

Based on the aspect described above, the performance of an antenna array can be evaluated by means of merely two antenna performance maps.

Optionally, the step of determining comprises calculating the changes between the two antenna performance maps at a plurality of positions. The step of determining further comprises in response to the change at a position being larger than or equal to a threshold, determining that there is an obstacle at the position or between the antenna array and the position.

Optionally, in response to the change at a position being larger than or equal to the threshold for a predetermined time length or more, it is determined that there is an obstacle at the position or between the antenna array and the position.

Optionally, the reference antenna performance map was generated during an initial operation after setup of the antenna array.

Optionally, the steps of acquiring, generating and determining are performed periodically.

Optionally, the reference antenna performance map was generated during the previous period.

Optionally, the position is represented by a UE's direction, and the UE's direction comprises direction of arrival (DOA) or beam index of the UE.

Optionally, the position is represented by a combination of a UE's direction and a distance between the antenna array and the UE.

Optionally, the signal metric comprises one of, or combination of, the following: signal power received from an uplink transmission of a UE; and reference signal receiving power (RSRP) reported from a UE.

Optionally, the method further comprises informing a UE of the generated antenna performance map and/or the obstacle related information.

According to another aspect of the disclosure, it is provided an apparatus for antenna performance evaluation. The apparatus comprises a processor and a memory. The memory contains instructions executable by the processor, whereby the apparatus is operative to acquire signal metrics and positions of a plurality of user equipments (UEs) within a coverage area of an antenna array. The instructions are executable by the processor, whereby the apparatus is further operative to generate, from the signal metrics and positions, an antenna performance map showing how signal metric as a variable changes relative to position as another variable. The instructions are executable by the processor, whereby the apparatus is further operative to determine obstacle related information based on the generated antenna performance map and a reference antenna performance map.

According to another aspect of the disclosure, it is provided a base station. The base station comprises an antenna array, a transceiver unit, a baseband unit and the apparatus according to the above aspect. The apparatus receives an output from the baseband unit to acquire the signal metrics and positions.

According to another aspect of the disclosure, it is provided a computer program. The computer program comprises instructions which when executed by at least one processor, cause the at least one processor to perform the method according to the above aspect.

According to another aspect of the disclosure, it is provided a computer readable storage medium. The computer readable storage medium comprises instructions which when executed by at least one processor, cause the at least one processor to perform the method according to the above aspect.

According to another aspect of the disclosure, it is provided an apparatus for antenna performance evaluation. The apparatus comprises an acquisition module for acquiring signal metrics and positions of a plurality of user equipments (UEs) within a coverage area of an antenna array. The apparatus further comprises a generation module for generating, from the signal metrics and positions, an antenna performance map showing how signal metric as a variable changes relative to position as another variable. The apparatus further comprises a determination module for determining obstacle related information based on the generated antenna performance map and a reference antenna performance map.

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

According to the observation of the inventors, even if the antenna array and corresponding baseband processing of a base station is ideal, during and after real site implementation, it still could face antenna performance degradation due to changes of the site physical situation.

Normally, before real site implementation, drive test and other tests are conducted to achieve network evaluation and network optimization. However, after real site implementation, obstacles such as tree branch, outdoor billboard and so on could gradually appear and increase. In particular, when the obstacles are closer to the antenna, their impact to the network is more critical.

In addition to line-of-sight channel, different channel may exist in reality, and even non-line-of-sight channel may exist and dominate. Combined beams around corner enable null-forming also for non-line-of-sight channel. Even so, when an obstacle is close to the antenna, its impact to the throughput is still a problem.

Currently, there are two solutions which might be used to solve the problem. The first solution is manual verification on-site. It requires man-hour costs, and further requires on-site fee if the site is owned by another company.

The second solution is minimized drive test (MDT). It focuses on user equipment (UE) side, and thus needs additional feature of UE. Furthermore, it cannot directly indicate the close range of a base station (BS) antenna, and cannot distinguish the antenna performance problem or UE environment problem either. Generally, the first one (i.e., it cannot directly indicate the close range of a BS antenna) is rather more critical than the latter one (i.e., it cannot distinguish the antenna performance problem or UE environment problem).

Therefore, there is a need for the network operator to evaluate or detect the BS antenna performance to improve network quality. There is also a need for the BS vendor to add the function of antenna performance evaluation to provide added value.

The present disclosure proposes a solution for evaluating or detecting antenna performance. It may overcome at least one of the drawbacks mentioned above, or it may not overcome any one of the drawbacks mentioned above. Hereinafter, the solution will be described in detail with reference to FIGS. 2-10.

Figure 2:
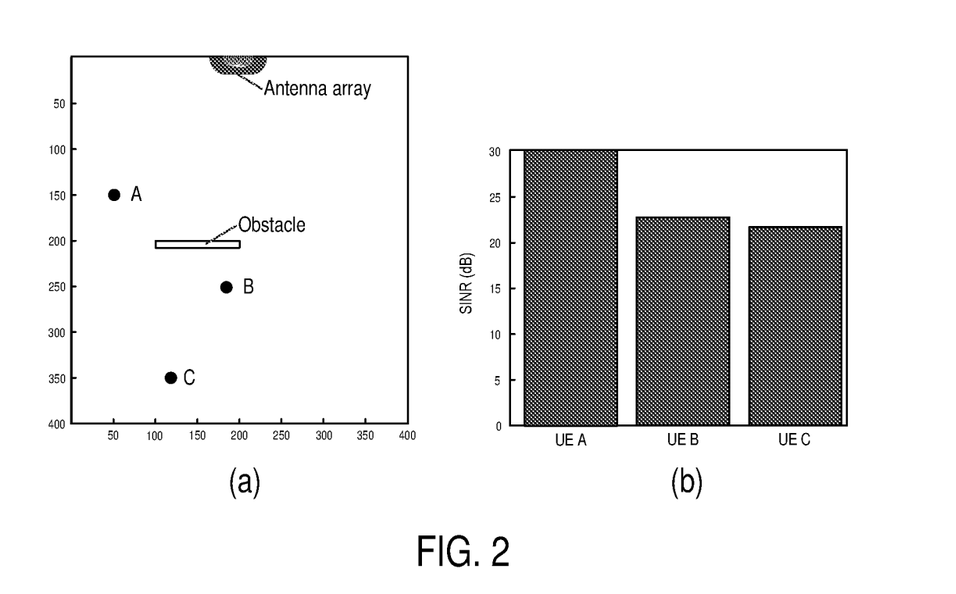
FIG. 2 shows the impact of an obstacle to the performance of multiple user equipments.

FIG. 2 shows the impact of an obstacle to the performance of multiple UEs. FIG. 2(a) is a plan view showing the positions of the antenna array, the obstacle and the UEs. The coordinate unit of x and y axes is the wavelength of radio waves. As shown, there are three UEs, i.e. UE A, UE B and UE C. UE A is not blocked by the obstacle. UE B is blocked by the obstacle, but close to the edge of the obstacle. UE C is blocked by the obstacle, and close to the line extending from the antenna array to the middle point of the obstacle.

FIG. 2(b) is a column chart showing the simulation results of the UEs' signal to interference plus noise ratios (SINRs). The interference for one UE comes from the remaining UEs. For example, the interference for UE A comes from UE B and UE C. Because UE A is not blocked by the obstacle, its SINR is the highest and may be used as a benchmark. Because UE B and UE C are blocked by the obstacle, their SINRs have corresponding degradations relative to UE A. Because UE C is blocked more severely than UE B, UE C's SINR has the worst degradation. Based on FIG. 2, if the positions of multiple UEs are mapped onto X axis and their corresponding signal metrics are mapped onto Y axis, it is possible to detect the position of the obstacle.

Figure 3:
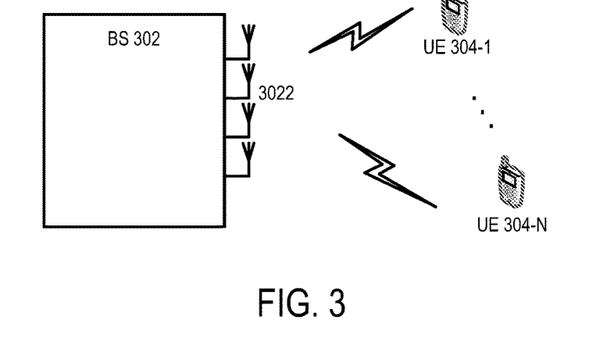
FIG. 3 shows a system to which the principle of the disclosure is applicable.

FIG. 3 shows a system to which the principle of the disclosure is applicable. As shown, the system is a wireless communication system, and may comprise a BS 302 supporting a corresponding service in a coverage area (also referred to as a cell). BS 302 is also capable of communicating with a plurality of UEs, i.e. UEs 304-1 to 304-N within the coverage area. The communications between BS 302 and UEs 304-1 to 304-N may employ any wireless communication standards such as CDMA, TDMA, FDMA, OFDMA, SC-FDMA and so on.

BS 302 comprises an antenna array 3022. Based on the description given below, one skilled in the art will understand that the principle of the present disclosure may be applied to any BS with an antenna array. As an example, BS 302 may conform to 3G standards, and comprise a NodeB and a radio network controller (RNC). The NodeB may comprise a remote radio unit (RRU) and a building baseband unit (BBU). As another example, BS 302 may be an evolved Node B (eNodeB) conforming to Long Term Evolution (LTE) standards. The eNodeB may comprise a RRU and a BBU.

UEs 304-1 to 304-N may be referred to as, for example, devices, mobile stations, mobile units, subscriber stations, wireless terminals, terminals, or the like. Each one of them may be mobile or stationary, and may be, for example, a wireless handheld device such as a wireless phone, a computer with a wireless connection to a network, a wireless plug-in accessory, or the like.

Figure 4:
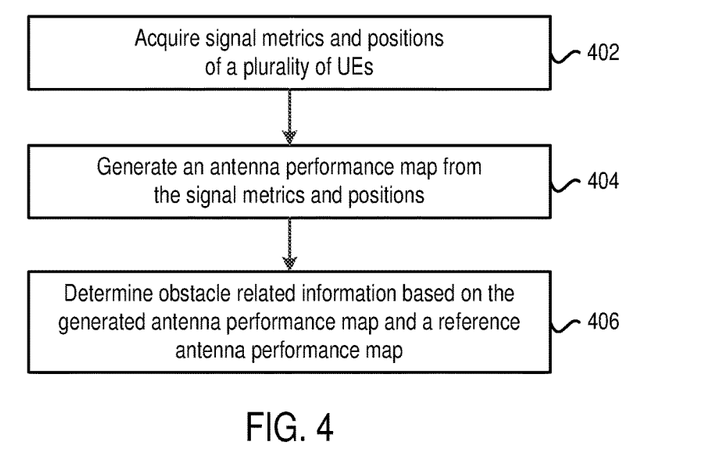
FIG. 4 is a flowchart illustrating a method according to an embodiment of the disclosure.

FIG. 4 is a flowchart illustrating a method according to an embodiment of the disclosure. The method may be performed by the processor and the memory of a base station (e.g., RNC, NodeB or eNodeB as described above). At step 402, signal metrics and positions of a plurality of UEs within a coverage area of an antenna array are acquired. As mentioned above, the coverage area may be referred to as a cell. The plurality of UEs may be a portion of or all of the UEs within the coverage area of the base station. They are not limited to a fixed group of UEs, and may vary over time in identity and quantity. In this embodiment, the signal metric and position may be derived from the existing normal communications (e.g., voice traffic, data traffic, signaling traffic, or the like) between the base station and the UEs. In this way, the signal metric and position of a UE may be acquired without requiring the UE to possess additional functions.

As an example, the signal metric is signal power received from an uplink transmission of a UE. The uplink transmission may comprise the transmission on for example physical uplink shared channel (PUSCH) and/or physical uplink control channel (PUCCH). The uplink receiving power may be acquired from the output of the baseband unit such as the BBU described above.

As another example, the signal metric is reference signal receiving power (RSRP) reported from a UE. For example, an eNodeB may request the RSRP via Radio Resource Control (RRC) configuration of measurement reports. The measurement reports are configured for different purposes, such as handover. The measurement reports can also be based on specific trigger thresholds applicable to the measurement type. For example, the RSRP is below a threshold. They are received only when such triggers are fulfilled. The UE may measure the RSRP by using L3 measurement request, and feed the RSRP back to the eNodeB. Thereby, the RSRP may be acquired from the output of the baseband unit, such as the BBU described above.

As still another example, the signal metric is a combination (e.g., a weighted sum) of the uplink receiving power and RSRP. It should be noted that the present disclosure is not limited to the above examples, and any other signal metrics that may be derived from the uplink transmission may be employed.

The position of a UE may be represented by at least the UE's direction. Further, the position of a UE may be represented by a combination of the UE's direction and a distance between the antenna array and the UE. As an example, a UE's direction comprises direction of arrival (DOA) of the UE. The DOA of a UE may be derived by the baseband unit (e.g., the BBU of a NodeB or eNodeB) from the uplink beamforming information of the UE. For instance, the uplink beamforming information may be transformed into beam space by applying a discrete Fourier transformation (DFT) in spatial domain. Then the DOA may be obtained from the beam space. However, the present disclosure is not limited to the examples, and any other DOA algorithms may also be used. Thereby, the DOA may be received from the baseband unit.

As another example, a UE's direction comprises beam index of the UE. Each beam index may correspond to one or more sets of antenna weight values, wherein each set of antenna weight values may uniquely identify a beam. As an example, a BS cell may be divided into a plurality of sectors by a corresponding plurality of beams. The BS may transmit on each of the beams its corresponding beam index. A UE may measure the signal metrics of different beams and report the beam index of the optimum beam (e.g., having the highest signal metric) to the BS. In this way, the reported beam index or the angle range corresponding to it may be used as an approximate value of the UE's direction. As another example, a UE may perform an uplink transmission by using a plurality of beams. The UE may transmit on each of the beams its corresponding beam index. A BS may measure the signal metrics of different beams to determine the optimum beam (e.g., having the highest signal metric). In this way, the beam index of the optimum beam or the angle range corresponding to it may be used as an approximate value of the UE's direction. The beam index may be derived by the baseband unit (e.g., the BBU of a NodeB or eNodeB) from the uplink beamforming information of the UE. Thereby, the beam index may be received from the baseband unit.

As still another example, the distance between the antenna array and a UE may be estimated according to the UE's signal metric as mentioned above. Any existing algorithms or formulas for this purpose may be used. Then, the distance may be combined with the UE's direction (e.g., DOA or beam index) to represent the UE's position for example in an (x, y, z) coordinate system. The estimation of the distance may be performed by the baseband unit, or by another component (e.g., RNC) of the base station. Similarly, the combination of the distance and the UE's direction may be performed by the baseband unit, or by another component (e.g., RNC) of the base station. It should be noted that the present disclosure is not limited to the examples, and any other position information that may be derived from the uplink transmission may be employed.

At step 404, an antenna performance map showing how signal metric as a variable changes relative to position as another variable is generated from the signal metrics and positions. For example, the antenna performance map may be generated by fitting the signal metrics vs. positions into a curve. The generated antenna performance map may be a 3D map, or may comprise two or more 2D maps each of which shows how signal metric variable changes relative to one component of the position variable. As an example, x axis may represent the signal metric variable and y axis may represent the position variable. As another example, x axis may represent the position variable and y axis may represent the signal metric variable.

At step 406, obstacle related information is determined based on the generated antenna performance map and a reference antenna performance map. For example, the reference antenna performance map was generated during an initial operation after setup of the base station. In other words, when the site is setup or deployed after network arrangement, it may begin to capture the signal metric and position. After enough data is recorded, the reference antenna performance map may be built. Starting from the site setup may be beneficial because the network arrangement was run short time ago.

The obstacle related information may be determined by comparing the two antenna performance maps. In this way, the antenna performance may be evaluated by means of merely two antenna performance maps. Compared with the current solution of manual verification on-site, this is more cost efficient.

Optionally, steps 402-406 are performed periodically. In this way, the functionality and feature of monitoring antenna performance can be provided. In this case, a previous performance map can also be used as the reference antenna performance map.

Figure 5:
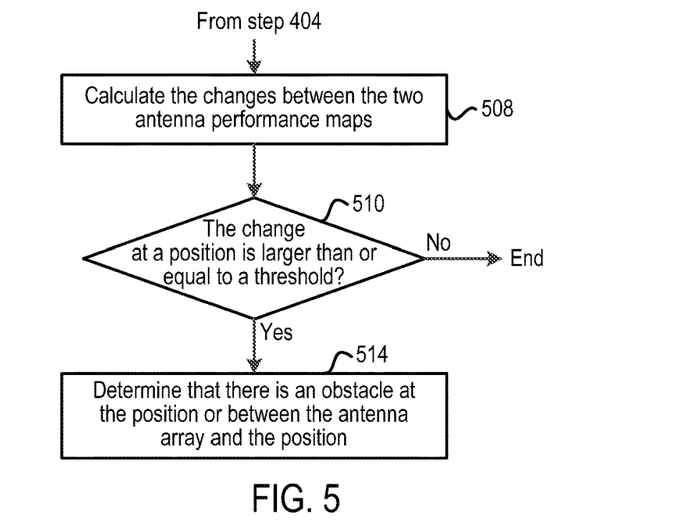
FIG. 5 is a flowchart illustrating a method according to another embodiment of the disclosure.

FIG. 5 is a flowchart illustrating a method according to another embodiment of the disclosure. As shown, the method comprises steps 402, 404, 508, 510 and 514. The details of steps 402 and 404 have been described above and thus are omitted here.

At step 508, the changes between the two antenna performance maps at a plurality of positions are calculated. The values of the generated antenna performance map (i.e., the signal metric values) at the plurality of positions may be extracted from its fitted curve. Likewise, the values of the reference antenna performance map (i.e., the signal metric values) at the plurality of positions may be extracted from its fitted curve. Then, the change between the two antenna performance maps at a position may be calculated as the difference or ratio between the values of the two antenna performance maps at the position. Since the current or reference antenna performance map is generated by fitting the acquired signal metrics and their positions into a curve, the value of the current or reference antenna performance map at a position may be a statistic of the signal metric values of lots of UEs at that position.

At step 510, it is checked whether the change at a position is larger than or equal to a threshold. The threshold may be a fixed value, or may vary over time so as to be tuned to an optimum value. If the check result is positive at step 510 (e.g., the change at a position is larger than or equal to a threshold), it is determined at step 514 that there is an obstacle at that position or between the antenna array and that position. In this case, further handling or processing may be done. For example, certain alarm log may be trigged. On the other hand, if the check result is negative at step 510, the process ends without performing any operations. This means that there is no obstacle near the antenna array.

Optionally, if the change at a position is larger than or equal to the threshold for a predetermined time length or more, it is determined that there is an obstacle at that position or between the antenna array and that position. For example, if the check result is positive at step 510, the process may wait for the predetermined time length. Then, steps 402, 404, 508 and 510 may be performed again. If the check result is still positive at step 510, it may be determined that there is an obstacle at that position or between the antenna array and that position.

Figure 6:
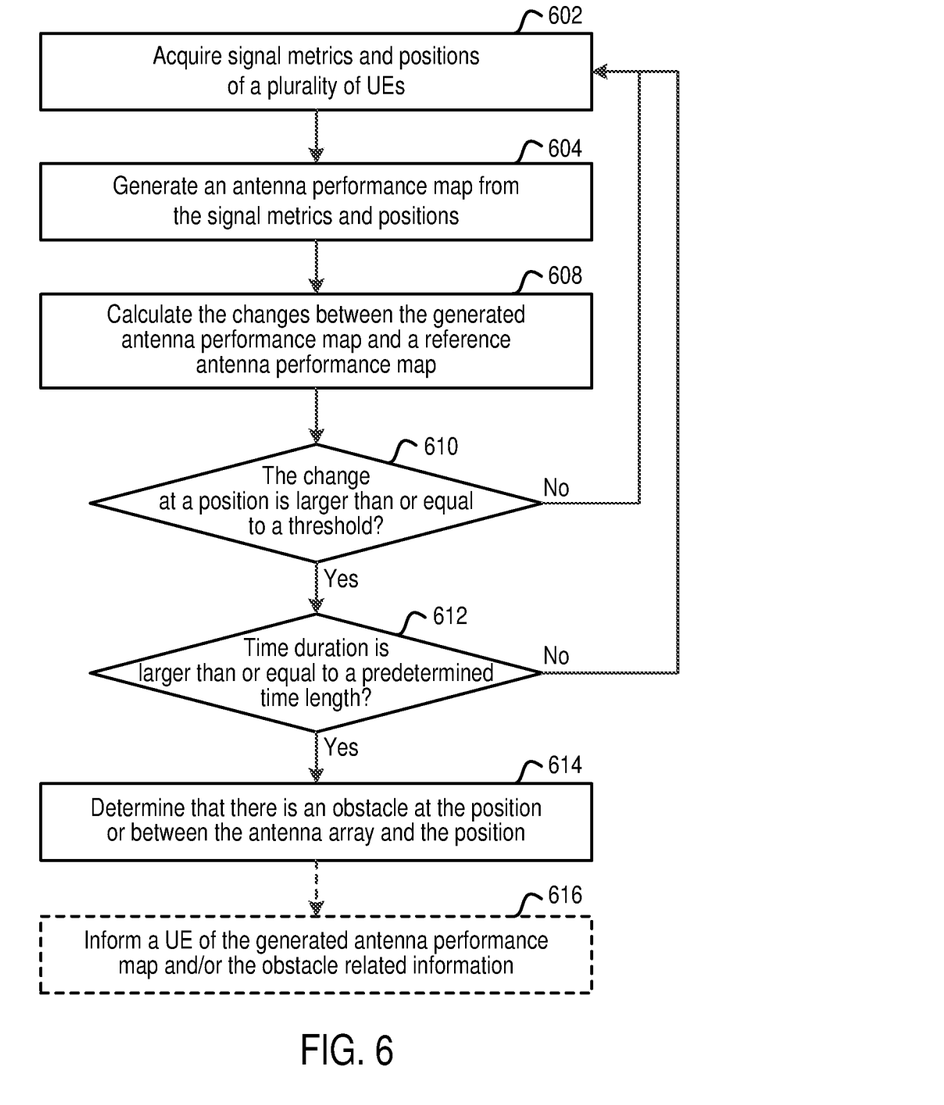
FIG. 6 is a flowchart illustrating a method according to still another embodiment of the disclosure.

FIG. 6 is a flowchart illustrating a method according to still another embodiment of the disclosure. In this embodiment, some of the method steps are performed periodically to monitor the antenna performance. Steps 602 and 604 are similar to steps 402 and 404, respectively. Step 608 is similar to step 508. Therefore, the details of these steps are omitted here. Step 610 is similar to step 510 except that if the check result is negative at step 610, the process proceeds to step 602 to begin the next evaluating period; and if the check result is positive at step 610, the process proceeds to step 612.

At step 612, it is checked whether the change at that position is larger than or equal to the threshold for a predetermined time length or more. For example, changes at a position during a series of time periods may be calculated and recorded. Thereby, a series of changes at that position during the previous periods may be retrieved to check whether the positive state of step 610 has lasted for the predetermined time length or more.

If the check result at step 612 is positive (e.g., the change at that position is larger than or equal to the threshold for the predetermined time length or more), it is determined at step 614 that there is an obstacle at that position or between the antenna array and that position. On the other hand, if the check result at step 612 is negative, the process proceeds to step 602 to begin the next evaluating period.

In this embodiment, the antenna performance map is monitored continually. However, the present disclosure is not limited to the example. The antenna performance map may also be monitored in a predetermined time interval or intermittently. For example, the antenna performance map may be monitored at morning, deep night and so on. In this way, excessive consumption of computational resources can be avoided.

Optionally, at step 616, the generated antenna performance map and/or the obstacle related information may be informed to a UE. For example, the user may know where to go for a better coverage. In this way, the degradation information may be provided to the user of the UE as added value.

To sum up, in the embodiment described with reference to FIG. 6, an antenna performance map may be generated based on the UEs' positions from the view point of the base station. Periodically, the current map may be compared with the initial/previous one. The difference between the two may be used to indicate possible obstacles and their positions.

Figure 7:
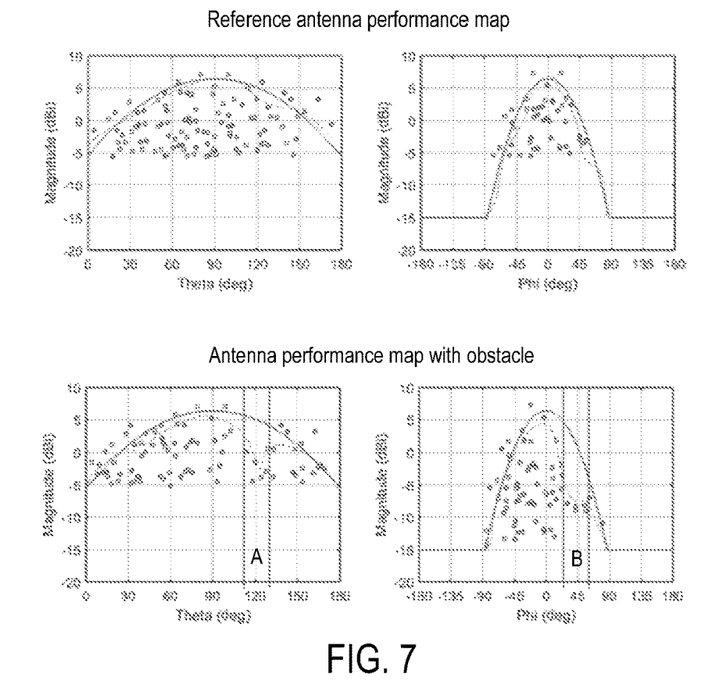
FIG. 7 shows an example of a reference antenna performance map and an antenna performance map with obstacle.

FIG. 7 shows an example of a reference antenna performance map and an antenna performance map with obstacle. As shown, the signal metric is represented by y axis and the position is represented by x axis. The signal metric is the signal power from a UE. The position is represented by DOA and has two components, i.e. azimuth angle (Theta) corresponding to horizontal plane, and pitch angle (Phi) corresponding to vertical plane. The dash line curve is the fitting of all dots.

As shown, in a case where an obstacle exists, the antenna performance map on the bottom side has some changes in the regions A and B relative to the reference map on the top side. The intersection between the regions A and B may indicate the direction of those UEs having undergone degradation in receiving performance due to an obstacle. This may indicate that there is likely an obstacle in that direction.

Figure 8:
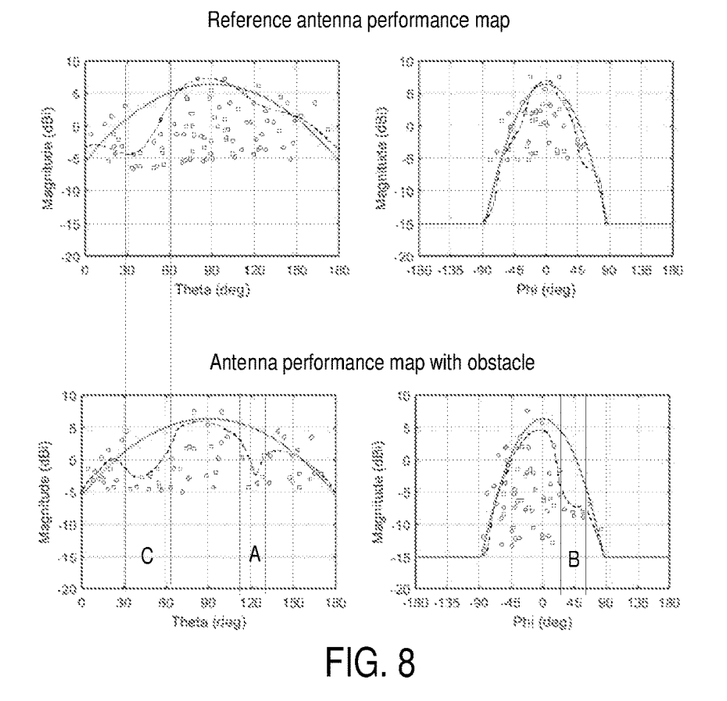
FIG. 8 shows another example of a reference antenna performance map and an antenna performance map with obstacle.

FIG. 8 shows another example of a reference antenna performance map and an antenna performance map with obstacle. FIG. 8 is similar to FIG. 7 except that the reference antenna performance map is not of ideal situation (see the region C having certain degradation). This may be because the service range of the antenna array has some physical limitation. For example, the antenna array is setup in a building. In this case, the reference map may be built soon after the site setup. At that time, there is no obstacle close to the antenna directly, since the site is selected properly in general. Similarly to FIG. 7, the comparison between the two antenna performance maps can also indicate that there is likely an obstacle in the direction represented by the intersection between the regions A and B.

Further, in the example shown in FIG. 7 or 8, the signal metric values corresponding to the regions A and B may be extracted from the fitted curve, and may be used to estimate the distance between the antenna array and those UEs having undergone degradation due to an obstacle. Then, the estimated distance may be combined with the direction to represent those UEs' position. In this case, there is likely an obstacle at that position or between the antenna array and that position.

Figure 9:
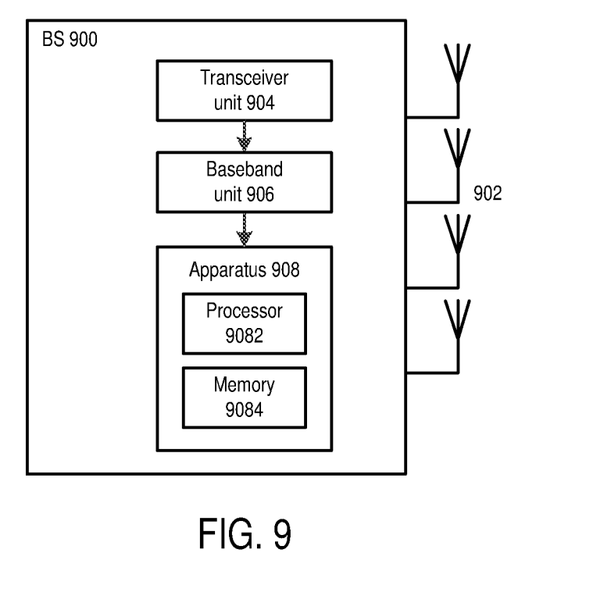
FIG. 9 is a block diagram illustrating an apparatus and a base station according to an embodiment of the disclosure.

FIG. 9 is a block diagram illustrating an apparatus and a base station according to an embodiment of the disclosure. As shown, the base station 900 comprises an antenna array 902, a transceiver unit 904, a baseband unit 906, and an apparatus 908. The antenna array 902 may be configured to transmit and/or receive radio frequency (RF) signals. The transceiver unit 904 may be configured to perform RF-to-baseband/baseband-to-RF processing. The baseband unit 906 may be configured to perform baseband processing. As described above, the baseband unit 906 may be configured to provide the signal metrics (e.g., uplink receiving power, RSRP, or the like) and positions (e.g., DOA, beam index, or the like) of a plurality of UEs. The apparatus 908 receives an output from the baseband unit 906 to acquire the signal metrics and positions. The apparatus 908 comprises a processor 9082 and a memory 9084. The memory 9084 contains instructions which may be executed by the processor 9082 to cause the apparatus 908 to perform the method steps described above with reference to FIGS. 4-6. For example, the apparatus 908 may be implemented in the RNC of the base station 900. In this way, no extra hardware cost is required.

Figure 10:
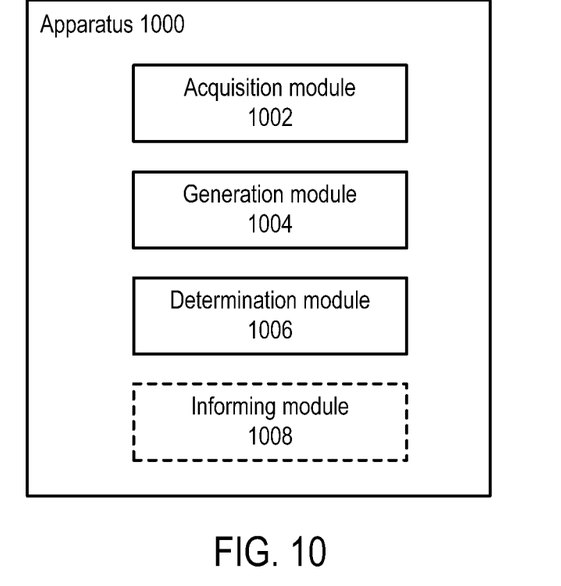
FIG. 10 is a block diagram illustrating an apparatus according to an embodiment of the disclosure.

FIG. 10 is a block diagram illustrating an apparatus according to an embodiment of the disclosure. As shown, the apparatus 1000 comprises an acquisition module 1002, a generation module 1004 and a determination module 1006. The acquisition module 1002 may be configured to perform step 402. The generation module 1004 may be configured to perform step 404. The determination module 1006 may be configured to perform step 406. Optionally, the apparatus 1000 may further comprise an informing module 1008 configured to inform a UE of the generated antenna performance map and/or the obstacle related information.

Optionally, the determination module may determine obstacle related information by: calculating the changes between the two antenna performance maps at a plurality of positions; and in response to the change at a position being larger than or equal to a threshold, determining that there is an obstacle at the position or between the antenna array and the position. Further, optionally, the determination module may determine obstacle related information by: in response to the change at a position being larger than or equal to the threshold for a predetermined time length or more, determining that there is an obstacle at the position or between the antenna array and the position.

Optionally, the generation module generated the reference antenna performance map during an initial operation after setup of the antenna array. Optionally, the acquisition module, generation module and determination module operate periodically. Further, optionally, the generation module generated the reference antenna performance map during the previous period.

The apparatus 1000 may be implemented as combinations of circuits and software and/or firmware instructions stored on one or more computer readable memories that work together to cause one or more functions described herein to be performed. The circuits include one or more processors and/or a portion thereof. The apparatus 1000 may also be implemented as hardware-only circuit (for example, implementations in analog circuit and/or digital circuit).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method for antenna performance evaluation, comprising:

acquiring signal metrics and positions of a plurality of user equipments (UEs) within a coverage area of an antenna array;

generating, from the acquired signal metrics and the acquired positions of the plurality of UEs, an antenna performance map showing how signal metric as a variable changes relative to position as another variable; and determining obstacle related information based on the generated antenna performance map and a reference antenna performance map,
wherein the step of determining comprises:
calculating changes between the generated antenna performance map and the reference antenna performance map at a plurality of positions; and
in response to a change of the changes at a position of the plurality of positions being larger than or equal to a threshold, determining that there is an obstacle at the position or between the antenna array and the position.

2. The method according to claim 1, wherein in response to the change at the position being larger than or equal to the threshold for a predetermined time length or more, it is determined that there is the obstacle at the position or between the antenna array and the position.

3. The method according to claim 1, wherein the reference antenna performance map is generated during an initial operation after setup of the antenna array.

4. The method according to claim 1, wherein the steps of acquiring, generating, and determining are performed periodically.

5. The method according to claim 4, wherein the reference antenna performance map is generated during a previous period.

6. The method according to claim 1, wherein a position of the positions is represented by a direction of a UE of the plurality of UEs, and wherein the direction of the UE comprises direction of arrival (DOA) or beam index of the UE.

7. The method according to claim 6, wherein the position is represented by a combination of the direction of the UE and a distance between the antenna array and the UE.

8. The method according to claim 1, wherein a signal metric of the signal metrics comprises one of, or a combination of, the following:
signal power received from an uplink transmission of a UE of the plurality of UEs; and
reference signal receiving power (RSRP) reported from the UE.

9. The method according to claim 1, further comprising:
informing a UE of the plurality of UEs of one or more of the generated antenna performance map and the obstacle related information.

10. An apparatus for antenna performance evaluation, comprising:
a processor; and
a memory, the memory containing instructions executable by the processor, whereby the apparatus is operative to:
acquire signal metrics and positions of a plurality of user equipments (UEs) within a coverage area of an antenna array;
generate, from the acquired signal metrics and the acquired positions of the plurality of the UEs, an antenna performance map showing how signal metric as a variable changes relative to position as another variable; and
determine obstacle related information based on the generated antenna performance map and a reference antenna performance map,
wherein the apparatus is operative to determine the obstacle related information by:
calculating changes between the generated antenna performance map and the reference performance map at a plurality of positions; and
in response to a change of the changes at a position of the plurality of positions being larger than or equal to a threshold, determining that there is an obstacle at the position or between the antenna array and the position.

11. The apparatus according to claim 10, wherein the instructions are executable by the processor, whereby the apparatus is operative to, in response to the change at the position being larger than or equal to the threshold for a predetermined time length or more, determine that there is the obstacle at the position or between the antenna array and the position.

12. The apparatus according to claim 10, wherein the instructions are executable by the processor, whereby the apparatus is operative to generate the reference antenna performance map during an initial operation after setup of the antenna array.

13. The apparatus according to claim 10, wherein the instructions are executable by the processor, whereby the apparatus is operative to periodically perform the operations of acquiring, generating, and determining.

14. The apparatus according to claim 13, wherein the instructions are executable by the processor, whereby the apparatus is operative to generate the reference antenna performance map during a previous period.

15. The apparatus according to claim 10, wherein a position of the positions is represented by a direction of a UE of the plurality of UEs, and wherein the direction of the UE comprises direction of arrival (DOA) or beam index of the UE.

16. The apparatus according to claim 15, wherein the position is represented by a combination of the direction of the UE and a distance between the antenna array and the UE.

17. The apparatus according to claim 10, wherein a signal metric of the signal metrics comprises one of, or a combination of, the following:
signal power received from an uplink transmission of a UE of the plurality of UEs; and
reference signal receiving power (RSRP) reported from the UE.

18. The apparatus according to claim 10, wherein the instructions are executable by the processor, whereby the apparatus is operative to inform a UE of the plurality of UEs of one or more of the generated antenna performance map and the obstacle related information.

19. A non-transitory computer readable storage medium comprising instructions which when executed by at least one processor, cause the at least one processor to:
acquire signal metrics and positions of a plurality of user equipments (UEs) within a coverage area of an antenna array;
generate, from the acquired signal metrics and the acquired positions of the plurality of UEs, an antenna performance map showing how signal metric as a variable changes relative to position as another variable; and
determine obstacle related information based on the generated antenna performance map and a reference antenna performance map,
wherein the obstacle related information is determined by:
calculating changes between the generated antenna performance map and the reference antenna performance map at a plurality of positions; and
in response to a change of the changes at a position of the plurality of positions being larger than or equal to a threshold, determining that there is an obstacle at the position or between the antenna array and the position.

* * * * *